United States Patent [19]

Hall

[11] 4,334,989
[45] Jun. 15, 1982

[54] FUEL-WATER SEPARATOR WITH PISTON-CHECK VALVE WATER DISPOSAL TO EVAPORATOR

[75] Inventor: John F. Hall, Bloomfield Hills, Mich.

[73] Assignee: Chrysler Corporation, Highland Park, Mich.

[21] Appl. No.: 221,140

[22] Filed: Dec. 29, 1980

[51] Int. Cl.³ .............................................. B01D 35/02
[52] U.S. Cl. ...................................... 210/114; 210/116; 210/117; 210/171; 210/181; 210/262; 210/303; 210/307; 210/310; 210/313
[58] Field of Search ............. 123/188 R; 417/36, 490; 210/114, 116, 117, 119, 136, 168, 171, 181, 186, 248, 262, 303, 307, 310, 313, 422

[56] References Cited

U.S. PATENT DOCUMENTS

| | | | |
|---|---|---|---|
| 2,557,880 | 6/1951 | Lynn | 417/490 X |
| 4,150,639 | 4/1979 | Buszek | 123/25 B |
| 4,257,890 | 3/1981 | Hurner | 210/117 X |

FOREIGN PATENT DOCUMENTS 3490 of 1895 United Kingdom ............... 417/490

Primary Examiner—Charles N. Hart
Assistant Examiner—David R. Sadowski
Attorney, Agent, or Firm—Newtson and Dundas

[57] ABSTRACT

In an automobile fuel system and particularly for a diesel powered vehicle, it is desirable to provide a water separator to prevent passage of water to the engine and particularly the fuel induction components. It is also desirable to provide ejection means for the separated water which may include a provision to prevent the ejected water from falling to the ground.

3 Claims, 2 Drawing Figures

FUEL-WATER SEPARATOR WITH PISTON-CHECK VALVE WATER DISPOSAL TO EVAPORATOR

The invention in this application relates to a water separator for an engine fuel system and includes ejection means for discharging the separated water from the device.

The passage of significant quantities of water with fuel to a vehicle engine is generally undesirable. Most gasoline fueled engines can accommodate relatively large amounts of water before problems such as poor drivability and stalling occur. However, diesel type engines which are powered by fuel oil are much less tolerant of water mixed with the fuel. Normally these engines utilize fuel injection devices for introducing pressurized fuel to the engine cylinders. The fuel is supplied to the injection devices by means of a pump which may normally have a significant pressure output. As compared to carburetors, the pump and injectors are expensive devices and are sensitive to water which has an undesirable corrosive effect on this equipment. Therefore it is desirable to prevent the passage of any substantial amount of water to fuel injection equipment.

There are several commercially available devices which separate water from fuel and may be used on an internal combustion diesel engine. Normally these devices provide a rather large housing to store water which is separated from the fuel therein. As a result, they have been used extensively on the larger truck engines. A diesel powered passenger vehicle employing a water separator does not have the space for a large housing. The typical passenger car owner also does not have the inclination to periodically empty the storage container. It is in view of this background that the present invention has been developed.

The subject invention includes a relatively small and hollow housing having inlet and outlet fittings adapted to be connected in the fuel line between the vehicle fuel tank and the diesel fuel pump of the vehicle. Normally the preferred location is adjacent the engine. A chamber or enclosure formed in the upper portion by the housing and between the inlet and outlet is partially filled with a fuel pervious material which has the effect of interrupting or defining the flow of fuel through the housing. The resulting turbulence and slowing of the flow gives incentive for water and fuel to separate, the heavier water falling to the bottom of the housing while the fuel continues to flow through the oulet. At the bottom of the housing, a piston-like plunger is slidably fitted in a bore so that a small purge chamber is formed beneath the plunger. A groove or channel is partially formed in the side of the plunger so that water collected thereabove may pass into the purge chamber. At the bottom of the purge chamber, a normally closed valve and a valve seat cooperate to permit the collection and retention of water. An electrically actuated solenoid is operably connected to the plunger so as to permit selective downward movement thereof. As a result of this downward movement, the water in the chamber is forced past the valve and through an opening in the bottom of the housing. The electrically actuated solenoid may be operated to move the plunger just once or successively depending on the volume of ejected water which is desired.

It may be undesirable in some circumstances for ejected water to fall upon the ground or pavement. Therefore, means are hereby provided to temporarily collect and store the water until engine heat can evaporate the water. The collecting means as well as the heating means may simply be the manifold of the engine. Also, a small container in close proximity to the engine manifold may be utilized to collect and evaporates the water.

Therefore, an object of the invention is the provision of a combination water separator and ejector device for use with the fuel system of vehicles.

A further object of the invention is to provide an automatic fuel-water separator and water ejector device characterized both by compactness and simplicity and including an electrically actuated water ejector system so that a small purge container suffices to collect water thus making unnecessary a large volume container.

A still further object of the invention is to provide a device which is both compact and simple for separating water from fuel particularly in a fuel supply system of a diesel engine and for automatically ejecting collected water from the device.

Further objects and advantages of this water separator and ejector device will be more readily apparent after a careful reading of the following detailed description of the specific embodiment with reference to the drawings described hereinafter.

IN THE DRAWINGS

Figure 1:
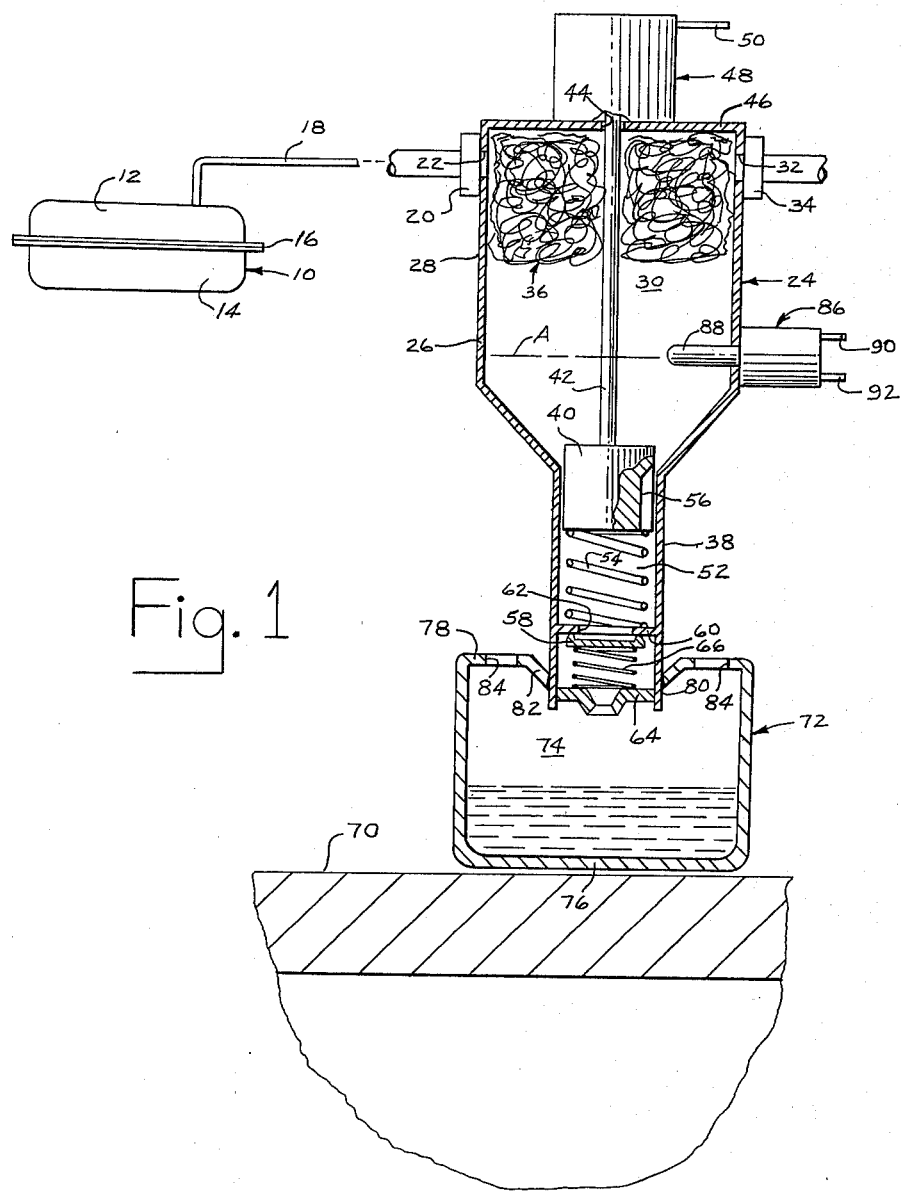
FIG. 1 is a sectioned view of the device and shown in connection with a fuel system for an engine, a portion of the engine manifold being shown.

In FIG. 1 of the drawings, a vehicle fuel tank 10 is shown rather schematically and includes an upper half shell 12 and a lower half shell 14 each of which comprise thin dome-shaped members. The shells 12 and 14 are joined at peripheral edge portions 16 to form a hollow fuel tank as is conventional in the automobile art. A fuel outlet line 18 extends into the interior of the hollow tank to transmit fuel to a vehicle engine. The fuel line 18 extends to an inlet fitting 20 defining an inlet passage 22 of a water separator and ejector device 24. The device 24 includes a generally tubular housing 26 formed of thin-walled material such as sheel metal. The upper end portion 28 of the housing 26 defines a chamber or enclosure 30 through which fuel must pass as it flows from the inlet passage 22 to an outlet passage 32 as defined by a fitting 34. A fluid pervious material 36 within the chamber 30 functions to defuse or disrupt the relatively consistent and rapid flow of fuel through the supply line so that any water mixed with the fuel will tend to descend toward the bottom of enclosure 30 due to water's greater specific gravity as compared to fuel oil. Thus, material 36 acts to diffuse the flow of fuel and water thereby to enhance the separation of water.

A lower portion 38 of the housing 26 defines a reduced diameter housing or purge enclosure 52 in which a piston type plunger 40 may reciprocate. The plunger 40 is connected to a stem 42 which extends through the upper enclosure 30 and through a small opening 44 in the upper wall 46 of housing 26. In a rather conventional manner, the stem 42 operably connects to the movable core of an electric solenoid activator 48 which is only shown in outline form due to its rather conventional nature. Solenoid 48 has a pair of tab-like electrical connectors (one is visible while the other is behind the one) which are adapted to be connected to power source by a control circuit for selectively actuating the solenoid as desired. When solenoid 48 is energized through the connectors 50, the resultant solenoid force causes stem 42 and plunger 40 to move downward thereby reducing the volume of pump chamber 52. Note that a spring 54 tends to resist downward movement and serves to return the activator 40 to its upward position shown in FIG. 1.

It should be noted that separated water from the lower part of enclosure 30 is normally communicated with the purge enclosure 52 by means of a groove in the plunger 40. This bypass communication is then cut-off or blocked by slight downward movement of the plunger 40. Once the bypass groove is blocked by cooperation with the lower housing portion 38, fluid within the purge enclosure 52 is forced against a valve member 58. Valve 58 seats at its peripheral edge against a valve seat portion 60 of the housing 26. In response to sufficient fluid pressure, the valve 58 opens and then flows through an opening 62 in an outlet plug 64. Note that a light spring 66 normally urges the valve member 58 against the valve seat 60 and is retained by plug 64.

Figure 2:
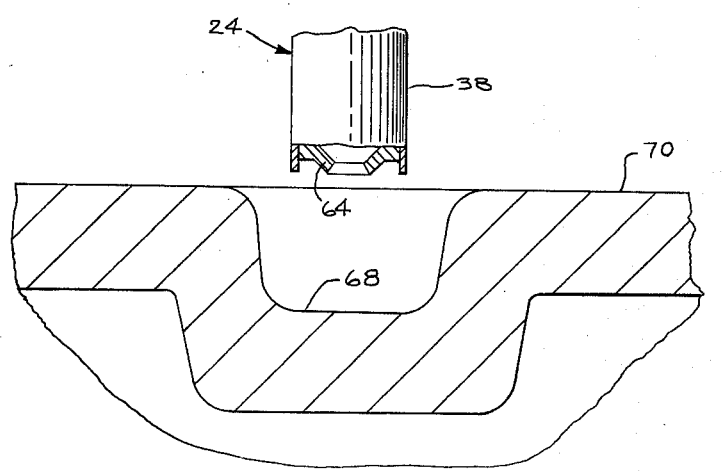
FIG. 2 is a sectioned view of a modified embodiment of the system also disclosing a portion of the engine manifold.

The ejected water which passes through opening 62 could easily be directed onto the ground or pavement. Alternatively, as in FIG. 2, the water may be directed into a small cavity 68 formed integrally by the engine exhaust manifold 70. This cavity 68 could also be formed by means of a separate member attached or supported by the manifold. In either case, the heat from the exhaust gases passing through the manifold 70 will rapidly evaporate the ejected water. In FIG. 1, a small water retaining cup and evaporating device 72 is shown supported by the lower portion 38 of housing 26. The retainer 72 is a thin-walled metal member of hollow construction forming a cavity or interior space 74 therein. The bottom wall 76 is in close proximity to the surface of the manifold 70 so that heat therefrom is readily transmitted to water within interior space 74. The top wall 78 of device 72 has a central opening 80 formed preferably by a punching operation so that semi-depending leg portions 82 are formed. These leg portions 82 are yieldable to permit the extension of the lower end of housing 26. A gripping support relation is formed therebetween. A plurality of vent openings 84 in the upper wall 78 permit water which is evaporated by the heat of the manifold to pass into the atmosphere.

In FIG. 1, a water level sensor 86 is disclosed. It is supported on the side wall of housing 26. The water level sensor includes a probe 88 which extends through the sidewall and into the upper enclosure 30. A pair of electrical connectors 90 and 92 are adapted to be connected to the control circuit for solenoid 48. This water level sensor may take any one of several forms which are commonly used and are capable of differentiating between distinctly different fluids. An electrical resistance-type sensor is one of the available choices. Another available type level sensor utilizes a variance in electrical capacitance when the probe portion engages differing fluids. The sensor 86 is able to distinguish when the water level approaches a level indicated by broken line A in FIG. 1. When this occurs, the sensor 86 signals the control circuit through the connectors 90, 92 and solenoid 48 is resultantly activated. Therefore, water stored in the purge cavity 52 is ejected through the bottom opening 62. It is apparent that the water sensor could also activate an instrument panel warning light which would indicate to the vehicle operator that there was some water in the fuel. Thus the vehicle operator may be immediately made aware of the receipt of contaminated diesel fuel.

The fuel system as described may provide a single solenoid activation when the water level reaches reference A. It is also possible to sequentially activate the solenoid 48 a multiple of times. This would increase the capacity of the device to eject water. Also, other means could be utilized to sense water other than the sensor 86. One option would be to utilize a timed device linked to the ignition circuit which would activate the solenoid periodically. Another option would be to utilize a mechanism linked to the vehicle odometer so as to activate the solenoid in response to mileage of the vehicle. The solenoid could also be activated manually be a vehicle operator using a switch on the instrument panel.

Although the embodiments shown are preferred, other embodiments and modifications are anticipated which would still fall within the scope of the following claims which define the invention.

What is claimed is as follows:

1. In a vehicle including an engine with an exhaust manifold, an automatic fuel-water separator and disposal assembly for series insertion in the engine fuel supply line, comprising: thin wall enclosure means defining a generally hollow interior space, the enclosure means having a generally elongate configuration with first and second end portions; fuel inlet and outlet means of the enclosure for connection to the fuel line at the first end portion to permit fuel to flow through the interior space; the second end portion of the enclosure means having a depending cylindrically walled portion axially projecting downward from the first portion for the purpose of collecting water which may be separated from fuel passing between the inlet and outlet; diffusion means between the fuel inlet and outlet to promote separation of water from fuel and to permit settling of water into the depending cylindrical portion of the enclosure means; a cylindrical piston valve encircling surrounded by the depending cylindrical portion of the enclosure means with a bottom surface movable therewith toward and away from the first portion of the enclosure means; yieldable means engaging the piston valve and normally holding it positioned toward the first end portion thereby defining a purge chamber for water beneath the bottom surface of the piston valve; the depending cylindrical portion defining a discharge opening located downward from the bottom surface of the piston valve for the discharge of water from the purge chamber; check valve means across the discharge opening to normally prevent the flow of water from the purge chamber but to permit such flow only when the bottom surface of the piston valve moves toward the check valve means which thereby decreases the volume of the purge chamber to eject the water; the piston valve having normally open passage means therein connecting the purge chamber with the interior space above the piston valve; the piston valve and cylindrical portion of the enclosure means being cooperative to close the passage means when the piston valve is moved to decrease the volume of the purge chamber; means operably connected to the piston valve to selectively produce movement thereof to decrease the volume of the purge chamber whenever ejection of water from the assembly is necessary; water catch means associated with the engine exhaust manifold to temporarily collect water which has been ejected from the purge chamber whereby exhaust heat subsequently boils the ejected water and releases it to the atmosphere thus avoiding undesirable ejection upon the ground.

2. The assembly as set forth in claim 1 in which the water catch and heating means associated with the manifold includes a generally open upper ended depression formed in the manifold itself positioned in alignment with the depending cylindrical portion of the enclosure means so that water ejected therefrom flows into the cavity temporarily until boiled in response to engine exhaust heat.

3. The assembly as set forth in claim 1 in which the water catch and heating means includes a generally open upper ended retainer cup formed with thin metal walls to receive ejected water from the purge chamber; at least the walled surface of the retainer cup being in close heat transfer relation to the engine exhaust manifold to readily receive heat therefrom for boiling water therein.

* * * * *